(12) United States Patent
Rosenzweig (10) Patent No.: US 12,125,136 B2
(45) Date of Patent: *Oct. 22, 2024

(54) TRANSFERRING DATA FROM VEHICLES (71) Applicant: Ottopia Technologies Ltd., Tel Aviv (IL)

(72) Inventor: Amit Rosenzweig, Tel Aviv (IL)

(73) Assignee: Ottopia Technologies Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,999

(22) Filed: Dec. 12, 2023

(65) Prior Publication Data

US 2024/0112393 A1  Apr. 4, 2024

Related U.S. Application Data

(63) Continuation of application No. 18/153,519, filed on Jan. 12, 2023, now Pat. No. 11,869,134, which is a continuation of application No. 16/702,611, filed on Dec. 4, 2019, now Pat. No. 11,580,687.

(60) Provisional application No. 62/774,897, filed on Dec. 4, 2018.

(51) Int. Cl.

| | |
|---|---|
| *G06T 15/08* | (2011.01) |
| *G05D 1/00* | (2006.01) |
| *G05D 1/225* | (2024.01) |
| *G06T 17/05* | (2011.01) |
| *G06V 20/56* | (2022.01) |

(52) U.S. Cl.
CPC ........... *G06T 15/08* (2013.01); *G05D 1/0044* (2013.01); *G05D 1/225* (2024.01); *G06T 17/05* (2013.01); *G06V 20/56* (2022.01); *G06T 2207/30252* (2013.01); *G06T 2210/12* (2013.01)

(58) Field of Classification Search
CPC ......... G05D 1/225; G06T 15/08; G06T 17/05; G06T 2207/30252; G06T 2210/12; G06V 20/56; H04N 7/183; H04N 19/50; H04N 19/25; H04N 19/20

See application file for complete search history.

(56) References Cited

U.S. PATENT DOCUMENTS

| | | | |
|---|---|---|---|
| 6,233,279 | B1 | 5/2001 | Boon |
| 9,612,123 | B1 | 4/2017 | Levinson et al. |
| 9,625,264 | B1 | 4/2017 | Imanishi et al. |
| 9,672,446 | B1 | 6/2017 | Vallespi-Gonzalez |
| 10,678,259 | B1 | 6/2020 | Ferguson et al. |
| 11,295,163 | B1 | 4/2022 | Schoner et al. |
| 2014/0160252 | A1 | 6/2014 | Randler et al. |
| 2016/0163205 | A1 | 6/2016 | Jenkins |
| 2018/0089816 | A1 | 3/2018 | Potter et al. |
| 2018/0150698 | A1 | 5/2018 | Guttmann et al. |
| 2018/0232639 | A1 | 8/2018 | Lin et al. |

(Continued)

*Primary Examiner* — Phi Hoang
(74) *Attorney, Agent, or Firm* — M&B IP Analysts, LLC (57) ABSTRACT

A system includes at least one imaging sensor and a processor. The processor is configured to acquire detected data describing an environment of a vehicle using the at least one imaging sensor; derive reference data which describes the environment from a predefined map; compute difference data representing a difference between the detected data and the reference data; and transfer the difference data, wherein an image computed based on the difference data and the reference data represents the detected data.

19 Claims, 5 Drawing Sheets

(56) References Cited

U.S. PATENT DOCUMENTS

| | | |
|---|---|---|
| 2018/0308236 A1* | 10/2018 | Jales Costa ............... G06T 7/11 |
| 2018/0321685 A1 | 11/2018 | Yalla et al. |
| 2019/0050685 A1 | 2/2019 | Kaminski et al. |
| 2019/0213290 A1* | 7/2019 | Delva ................. G01M 17/007 |
| 2019/0220462 A1 | 7/2019 | Sun et al. |
| 2019/0364403 A1 | 11/2019 | Abari et al. |
| 2020/0065711 A1 | 2/2020 | Clément et al. |
| 2020/0301799 A1 | 9/2020 | Manivasagam et al. |
| 2020/0302241 A1 | 9/2020 | White et al. |

* cited by examiner

TRANSFERRING DATA FROM VEHICLES

CROSS-REFERENCE TO RELATED APPLICATIONS

This application is a continuation of U.S. patent application Ser. No. 18/153,519 filed on Jan. 12, 2023, now allowed. The Ser. No. 18/153,519 application is a continuation of U.S. patent application Ser. No. 16/702,611 filed on Dec. 4, 2019, now U.S. Pat. No. 11,580,687, which claims the benefit of U.S. Provisional 62/774,897 filed on Dec. 4, 2018.

The contents of the above-referenced applications are hereby incorporated by reference.

TECHNICAL FIELD

The present invention relates to the field of image and data processing, particularly in the context of the control and operation of autonomous vehicles.

BACKGROUND

U.S. Pat. No. 9,767,369 describes a vehicle receiving one or more images of an environment of the vehicle. The vehicle may also receive a map of the environment. The vehicle may also match at least one feature in the one or more images with corresponding one or more features in the map. The vehicle may also identify a given area in the one or more images that corresponds to a portion of the map that is within a threshold distance to the one or more features. The vehicle may also compress the one or more images to include a lower amount of details in areas of the one or more images other than the given area. The vehicle may also provide the compressed images to a remote system, and responsively receive operation instructions from the remote system.

U.S. Pat. No. 9,494,935 describes computer devices, systems, and methods for remotely operating an autonomous passenger vehicle. When an autonomous vehicle encounters an unexpected driving environment unsuitable for autonomous operation, such as road construction or an obstruction, vehicle sensors can capture data about the vehicle and the unexpected driving environment, including images, radar and lidar data, etc. The captured data can be sent to a remote operator. The remote operator can manually operate the vehicle remotely or issue commands to the autonomous vehicle to be executed by on various vehicle systems. The captured data sent to the remote operator can be optimized to conserve bandwidth, such as by sending a limited subset of the captured data.

US Patent Application Publication 2019/0302761 describes at least partial control of a vehicle transferred to a control system remote from the vehicle. Sensor data may be received from a sensor(s) of the vehicle and the sensor data may be encoded to generate encoded sensor data. The encoded sensor data may be transmitted to the control system for display on a virtual reality headset of the control system. Control data may be received by the vehicle and from the control system that may be representative of a control input(s) from the control system, and actuation by an actuation component(s) of the vehicle may be caused based on the control input.

SUMMARY

There is provided, in accordance with some embodiments of the present invention, a system including at least one imaging sensor and a processor. The processor is configured to acquire, using the imaging sensor, detected data describing an environment of an autonomous vehicle. The processor is further configured to derive reference data, which describe the environment, from a predefined map, to compute difference data representing a difference between the detected data and the reference data, and to transfer the difference data.

In some embodiments, the processor is configured to transfer the difference data to storage.

In some embodiments, the processor is configured to transfer the difference data, over a network, to a remote server.

In some embodiments, the map includes a voxel map.

In some embodiments,
the detected data include a detected-data image,
the reference data include a reference image,
the difference data include a difference image, the processor being configured to compute the difference image by subtracting the reference image from the detected-data image, and
the processor is further configured to compress the difference image prior to transferring the difference image.

In some embodiments, the detected-data image, the reference image, and the difference image are three-dimensional.

In some embodiments, the map maps a plurality of background objects to respective locations.

In some embodiments,
the detected data include a full list of objects, the processor being configured to acquire the full list by identifying the objects in an image acquired by the sensor,
the reference data include a reference list of those of the background objects that are in a field of view (FOV) of the sensor, and
the difference data include a reduced list of the objects, the processor being configured to compute the reduced list by removing at least one of the background objects from the full list.

There is further provided, in accordance with some embodiments of the present invention, a method including, using at least one imaging sensor belonging to an autonomous vehicle, acquiring detected data describing an environment of the vehicle. The method further includes deriving reference data, which describe the environment, from a predefined map, computing difference data representing a difference between the detected data and the reference data, and transferring the difference data.

There is further provided, in accordance with some embodiments of the present invention, a system including a display and a processor. The processor is configured to derive, from a predefined map, reference data describing an environment of an autonomous vehicle. The processor is further configured to receive from the vehicle, over a network, difference data representing a difference between (i) detected data that describe the environment and were acquired using at least one imaging sensor belonging to the vehicle, and (ii) the reference data. The processor is further configured to compute an image representing the detected data by combining the difference data with the reference data, and to display the image on the display.

In some embodiments, the map includes a voxel map.
In some embodiments,
the reference data include a reference image,
the difference data include a compressed difference image, and the processor is configured to compute the image by:
  decompressing the difference image, and
    adding the decompressed difference image to the reference image.

In some embodiments, the reference image and the difference image are three-dimensional.

In some embodiments, the map maps a plurality of background objects to respective locations.

In some embodiments,
  the reference data include a reference list of those of the background objects that are in a field of view (FOV) of the sensor,
  the difference data include a reduced list of objects identified in an image acquired by the sensor, and
  the processor is configured to compute the image by rendering each object in the reduced list and in the reference list.

In some embodiments,
  the reference data include a reference image,
  the difference data include a reduced list of objects identified in an image acquired by the sensor, and
  the processor is configured to compute the image by superimposing a rendering of each of the objects onto the reference image.

There is further provided, in accordance with some embodiments of the present invention, a method including deriving, from a predefined map, reference data describing an environment of an autonomous vehicle. The method further includes receiving from the vehicle, over a network, difference data representing a difference between (i) detected data that describe the environment and were acquired using at least one imaging sensor belonging to the vehicle, and (ii) the reference data. The method further includes computing an image representing the detected data by combining the difference data with the reference data, and displaying the image.

There is further provided, in accordance with some embodiments of the present invention, a system including at least one imaging sensor, configured to acquire an image of an environment of an autonomous vehicle. The system further includes a first processor, configured to identify a plurality of objects in the image and to transfer, over a network, a list of at least some of the objects. The system further comprises a second processor, configured to receive the list, and in response to receiving the list, synthesize the image by rendering each of the objects in the list on a display.

The present invention will be more fully understood from the following detailed description of embodiments thereof, taken together with the drawings, in which:

DETAILED DESCRIPTION OF EMBODIMENTS

Overview

During the operation of an autonomous vehicle, the vehicle acquires images of the vehicle's environment. In some cases, the vehicle may be required to communicate the images to a remote server, typically with minimal latency, and/or to store the images in a data storage device. However, the volume of the acquired image data may be extremely large, rendering these tasks difficult and/or expensive.

To address this challenge, embodiments of the present invention derive smaller volumes of data from the image data, and then transfer the smaller volumes of data. For example, rather than transferring an acquired image to a remote server or to storage, the vehicle may identify relevant objects shown in the image. The vehicle may then transfer a list of the identified objects, the list including, for each object, a description of the object together with the location of the object. Based on the transferred list, the remote server may synthesize an approximation to the acquired image by rendering each of the objects at the proper location on screen. Advantageously, the size of the object list is typically much less than the size of the acquired image.

Alternatively or additionally, embodiments of the present invention may capitalize on the fact that each acquired image typically contains redundancies with respect to the predefined high definition (HD) map that is already used for navigation of the vehicle. In particular, the image may contain multiple background objects—such as a road or fixed objects at the side of the road—that are already represented in the HD map. In view of this fact, per embodiments of the present invention, the vehicle may remove the redundancies from the transferred data, thus reducing the volume of the transferred data.

For example, the vehicle may subtract, from the image, a background (or "reference") image derived from the map, thus generating a "difference image" that does not contain the background objects. Due to the smaller information content of the difference image, the difference image may be compressed to a greater extent than can the original image. Moreover, the remote server may independently derive the same background image, and then reconstruct the original image by adding the (decompressed) difference image to the background image.

As another example, the vehicle may remove from the aforementioned object list, prior to transferring the list, one or more background objects contained in an object map that is derived from the HD map. The remote server may then independently extract these background objects from the same object map, combine the background objects with the transferred objects, and synthesize the approximation image based on the combined list of objects. Alternatively, the remote server may superimpose a rendering of each of the transferred objects onto the appropriate background image.

System Description

Figure 1:
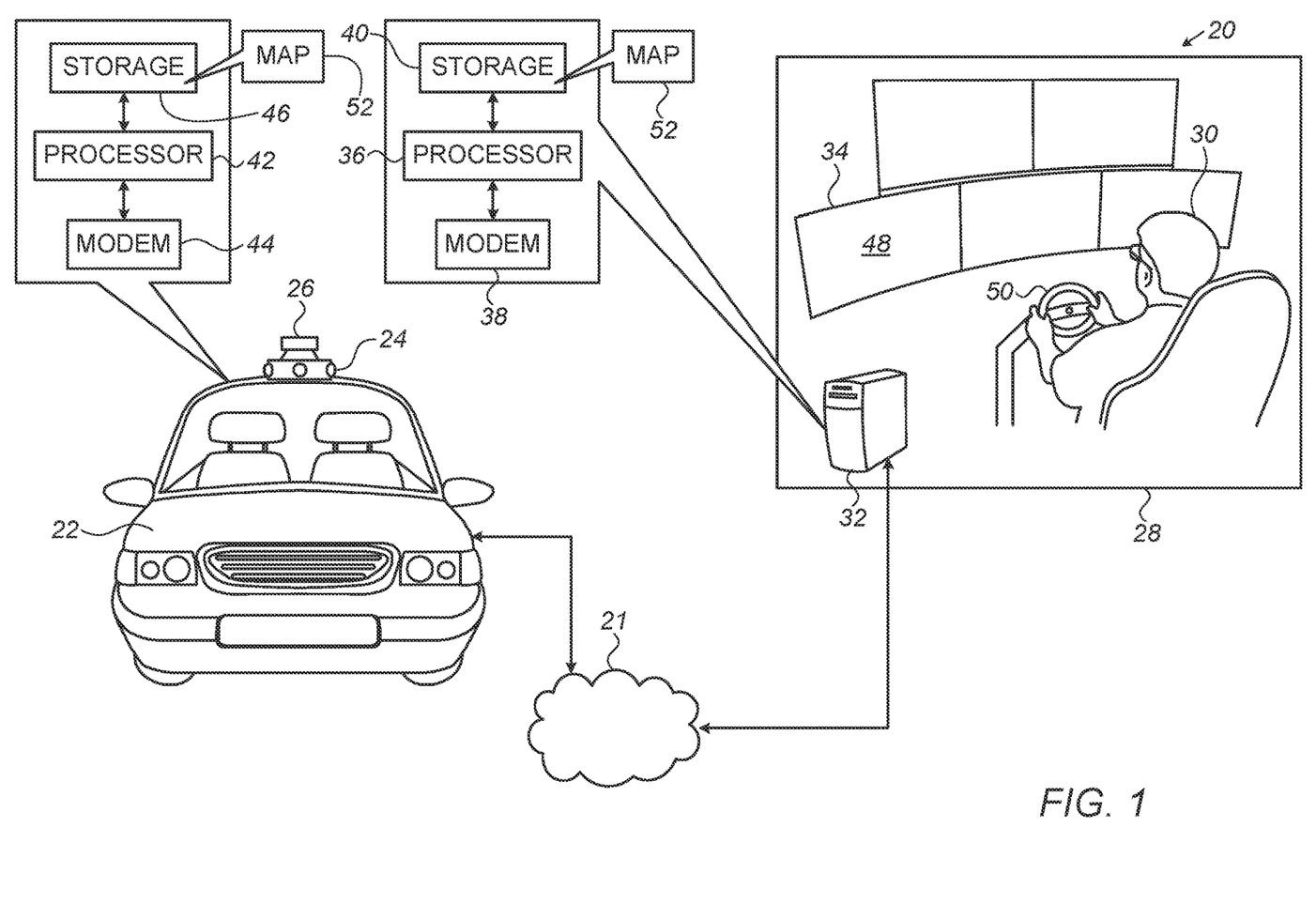
FIG. 1 is a schematic illustration of a system for transferring data from an autonomous vehicle, in accordance with some embodiments of the present invention.

Reference is initially made to FIG. 1, which is a schematic illustration of a system 20 for transferring data from an autonomous vehicle 22, in accordance with some embodiments of the present invention. Autonomous vehicle 22 may comprise a self-driving car, van, truck, bus, tractor, train, shuttle, trolley, forklift, platform, or any other type of vehicle, which may transport people, luggage, merchandise, and/or any other items.

Vehicle 22 comprises one or more imaging sensors, such as one or more cameras 24, a Light Detection and Ranging (LIDAR) sensor 26, a radar imager, and/or an ultrasonic imager. Typically, the vehicle further comprises other sensors for tracking the location, orientation, speed, and/or acceleration of the vehicle (and hence, of each of the imaging sensors), such as an accelerometer and/or a Global Positioning System (GPS) sensor. Vehicle 22 further comprises a processor 42. For embodiments in which the vehicle comprises a trunk, processor 42 may be located within the trunk of the vehicle.

As vehicle 22 operates, the imaging sensors acquire images of the environment of the vehicle, e.g., of the field of view (FOV) of cameras 24 and/or LIDAR sensor 26. (The environment may include an area ahead of the vehicle, behind the vehicle, beside the vehicle, and/or above the vehicle.) Based on the acquired images, processor 42 may, using image-processing techniques known in the art (e.g., image segmentation), identify various objects in the environment of the vehicle. Such objects may include, for example, a road, a traffic light, a hazard (e.g., a fallen branch, a person, or an animal), or another vehicle. In response to identifying the objects, processor 42 autonomously controls the vehicle.

Vehicle 22 further comprises a network interface 44, such as a modem. As the processor acquires data from the vehicle's sensors, the processor may transfer the data, via network interface 44, to a remote server 32. The data may be transferred wirelessly over a network 21 including, for example, a cellular network and/or the Internet.

For example, the processor may continually transfer the location, orientation, speed, and acceleration of the vehicle to remote server 32. In addition, the processor may transfer data derived from images acquired by the imaging sensors. Such data may include difference images, as further described below with reference to FIG. 2, and/or units of semantic information derived from the acquired images, as further described below with reference to FIG. 3.

In some embodiments, the derived data are transferred to the remote server continually at a relatively high rate (e.g., at least 25 images or units of semantic information per second), such that, based on the transferred data, the remote server may generate a video simulating the real-time environment of the vehicle. Alternatively, the data may be transferred continually at a lower rate, or only when instructions from the remote server are required.

Typically, vehicle 22 further comprises a data storage 46, such as a flash drive or hard drive. As the processor acquires data from the vehicle's sensors, the processor may transfer the data to data storage 46. The stored data may be used later for training the processor, debugging, and/or any other relevant task.

Alternatively or additionally to storing data from the vehicle's sensors, data storage 46 may store a predefined map 52, including, for example, a three-dimensional (3D) map of the general area in which the vehicle operates. For example, map 52 may include a voxel map, i.e., a three-dimensional array of grayscale or color values, a polygon map, or a point cloud. Such a map may be proprietary to the operator of vehicle 22 or may be provided by any map provider known in the art such as TomTom, Carmera, or DeepMap. Typically, the 3D map is a high definition (HD) map, in that the resolution of the map is relatively high, e.g., at a level of 1-5 cm. The 3D map may be used for route planning and navigation, and/or for reducing data volumes as described below with reference to FIG. 2.

Alternatively or additionally to a three-dimensional map, map 52 may include an object map extracted from a three-dimensional map, which may be used for reducing data volumes as described below with reference to FIG. 3.

Remote server 32 comprises a processor 36 and a network interface 38, such as a modem. Processor 36 is configured to receive data from the vehicle via network interface 38. Based on the received data, the processor may generate an image 48 describing the environment of the vehicle. Subsequently, the processor may display image 48 on a display 34.

Typically, remote server 32 resides at a remote control-center 28, which typically contains multiple displays 34 for simultaneously displaying information from different respective autonomous vehicles. A user 30 may monitor displays 34 and, if required, facilitate the operation of one or more of the vehicles. For example, in response to viewing image 48, user 30 may perform a control action for controlling vehicle 22, such as turning a steering wheel 50 or inputting instructions to the vehicle via a suitable user interface. In response to the control action, processor 36 may communicate instructions, via network interface 38, to the vehicle. Processor 42 may receive the instructions via network interface 44 and, in response to the instructions, control the vehicle.

Thus, for example, in the event that processor 42 detects an obstacle on the road and is unsure how to proceed, the user, by performing appropriate control actions, may cause the vehicle to circumvent the obstacle, drive over the obstacle, or perform any other appropriate action.

Typically, server 32 further comprises a data storage 40, such as a flash drive or hard drive, in which map 52 is stored. Processor 36 may use map 52 to generate image 48, as further described below with reference to FIGS. 2-3.

In some embodiments, processor 42 stores data in data storage 40 by communicating the data to processor 36 such that processor 36 stores the data in the data storage. Alternatively or additionally, processor 42 may store data in any other suitable remote data storage.

In general, each of processor 36 and processor 42 may be embodied as a single processor, or as a cooperatively networked or clustered set of processors. For example, in some embodiments, processor 36 is embodied by one or more first processors residing at a remote location different from remote control-center 28, such as a cloud-computing facility, which are cooperatively networked with each other and with a second processor residing at the remote control-center. Thus, for example, the vehicle may transfer data to the first processors, which may generate image 48 as described herein. Subsequently, the first processors may transfer the image to the second processor, and the second processor may then display the image.

In some embodiments, the functionality of each of the processors described herein is implemented solely in hardware, e.g., using one or more Application-Specific Integrated Circuits (ASICs) or Field-Programmable Gate Arrays (FPGAs). In other embodiments, the functionality at least one of the processors is implemented at least partly in software. For example, in some embodiments, a processor is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Reducing Volumes of Transferred Data

Figure 2:
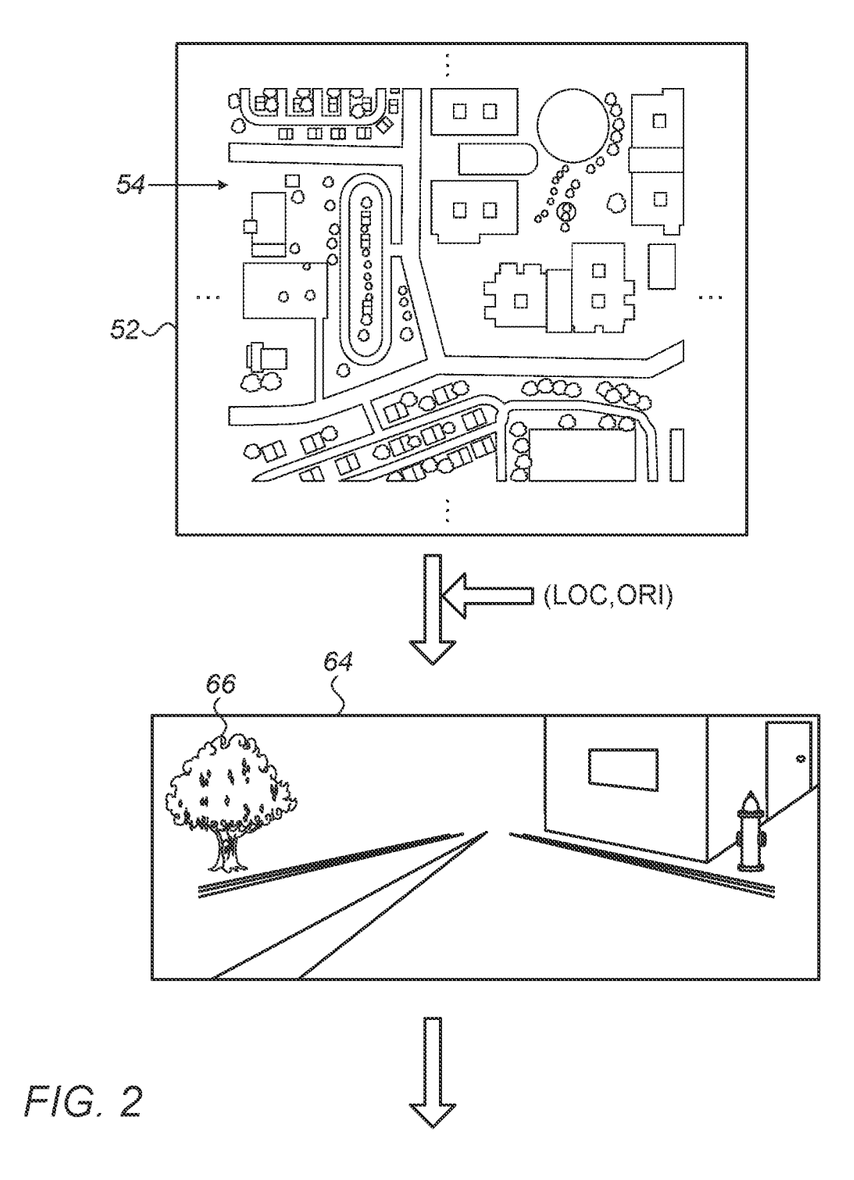
FIG. 2 is a schematic illustration of a use of a voxel map to reduce a volume of transferred data, in accordance with some embodiments of the present invention.

Reference is now made to FIG. 2, which is a schematic illustration of a use of a voxel map 54 to reduce a volume of transferred data, in accordance with some embodiments of the present invention.

As described above with reference to FIG. 1, the vehicle uses one or more imaging sensors to acquire images describing the environment of the vehicle. Thus, for example, the vehicle may acquire a two-dimensional or three-dimensional image 56, such as a camera image or LIDAR image. Typically, image 56 shows background objects, such as the road 58 on which the vehicle is operating and/or fixed objects (such as a tree 66) at the side of road 58. (In the context of the present application, including the claims, a "background object" may include any object that typically does not change its location for at least one day, such as a road or another object that is fixed to the ground.) Image 56 may also show one or more transient objects, such as a hazard 60 on or near the road.

Subsequently to acquiring image 56, the processor uses map 52 to generate a difference image 62 representing differences between image 56 and the map, and then transfers difference image 62 to the server. Since the aforementioned differences are typically relatively small, difference image 62 may be compressed to a much greater extent than can image 56; hence, the processor may transfer a smaller volume of data. Moreover, since the map is also stored by the server, the server may readily reconstruct image 56 by decompressing the difference image and then combining the difference image with image information from the map.

More specifically, the processor first derives a reference image 64 from map 52. For example, for embodiments in which the map comprises a voxel map 54, reference image 64 may be derived using any suitable algorithm for simulating the placement of the vehicle's imaging sensors at the current respective locations (LOC) and orientations (ORI) of the sensors and then extracting from voxel map 54 those voxels that would be seen by the sensors.

Subsequently to deriving reference image 64, the processor computes difference image 62 by subtracting the reference image from image 56. (Equivalently in the context of the present application, including the claims, the processor may subtract image 56 from the reference image.)

Typically, in the event that image 56 is two-dimensional, the processor first converts image 56 to three dimensions, such that both image 56 and reference image 64—and hence, difference image 62—are three-dimensional. Alternatively, the processor may first project reference image 64 to two dimensions, such that both image 56 and reference image 64—and hence, difference image 62—are two-dimensional. The processor may further resize reference image 64 and/or image 56 such that the two images are of the same dimensions. Alternatively, the processor may specify the dimensions of image 56 as an input to the algorithm that derives reference image 64, such that reference image 64 is of the specified dimensions.

Typically, the information content of the difference image is much less than that of image 56. For example, in the example shown in FIG. 2, the difference image includes hazard 60 but does not include the background objects from the reference image, such as road 58 and tree 66. Hence, the processor may compress the difference image significantly prior to transferring the difference image. For example, for embodiments in which the vehicle transfers the difference images as a video stream (e.g., at a rate of at least 25 images per second), the difference images may be compressed using Moving Picture Experts Group (MPEG) compression, Advanced Video Encoding (H264) compression, High Efficient Video Coding (H265) compression, or any other suitable video compression technique. For lower frame rates, Joint Photographic Experts Group (JPEG) compression or any other suitable image compression technique may be used.

Typically, due to various factors such as varying amounts of light exposure, small changes to the background objects over time (e.g., the trimming of branches from tree 66), and slight imprecisions in the derivation of the reference image, the difference image contains many small voxel (or pixel) values that do not represent any meaningful information. (To show this in FIG. 2, a background "noise" pattern fills the difference image.) Hence, typically, prior to compressing the difference image, the processor applies a threshold to the difference image, whereby voxels (or pixels) whose absolute value is below the threshold are set to zero or to another fixed background value.

Subsequently to compressing difference image 62, the processor transfers the difference image to the remote server, together with the current respective locations and orientations of the imaging sensors. Alternatively or additionally, the processor may transfer the difference image to storage 46 (FIG. 1).

To reconstruct image 56, processor 36 (FIG. 1) first derives reference image 64 from voxel map 54 as described above, based on the imaging sensor locations and orientations received from the vehicle. The processor also decompresses the difference image. Subsequently, the processor adds the decompressed difference image to the reference image. (Equivalently in the context of the present application, including the claims, the processor may subtract the decompressed difference image from the reference image in the event that the difference image was generated by subtracting image 56 from the reference image.) Subsequently, the processor displays the reconstructed image on display 34 (FIG. 1).

Typically, processor 36 does not execute a perfect reconstruction of image 56, but rather, computes another image that represents (or "approximates") image 56. For example, in some embodiments, the difference image is compressed using lossy compression techniques; alternatively or additionally, a threshold may be applied to the difference image prior to compression, as described above. Hence, it is noted that references herein to the "reconstruction" or "computation" of image 56 do not necessarily imply a perfect reconstruction, but rather, the computation of image 56 to a suitable degree of accuracy.

In some embodiments, rather than transferring difference images, the vehicle transfers units of semantic information derived from the acquired images, such as lists of objects identified in the acquired images. In this regard, reference is now made to FIG. 3, which is a schematic illustration of a use of an object map 68 to reduce a volume of transferred data, in accordance with some embodiments of the present invention.

In some embodiments, map 52 includes an object map 68, which maps a plurality of background objects 76 to respective locations. For example, each background object 76 may be mapped to the location of a bounding box that bounds the object, the bounding box being represented, for example, by the coordinates (x,y,z) of a corner of the box together with the size (i.e., the length $\Delta x$, width $\Delta y$, and height $\Delta z$) of the box. In such embodiments, object map 68 may be used to reduce the volume of transferred data, as described in detail below.

Object map 68 is derived from a three-dimensional map of the area in which the vehicle operates, such as the voxel map described above with reference to FIG. 2. For example, using image-processing techniques known in the art (e.g., image segmentation), processor 36 (FIG. 1) may identify each background object in the three-dimensional map. For each identified background object, the processor may identify a bounding box that encloses the object and then store, in object map 68, an association (or "mapping") between a description of the object and the location of the bounding box. This process may be repeated after every update to the three-dimensional map. Subsequently to deriving object map 68, the processor may transfer the object map to each autonomous vehicle in communication with the processor.

Subsequently to acquiring an image of the environment of the vehicle, the vehicle, by processing the image, detects one or more objects 78 in the environment. For each detected object 78, the vehicle identifies the location of the object, and associates the location with the object in a list 72. For example, the vehicle may identify a bounding box that encloses the object, and then associate the location of the bounding box-represented, for example, as described above for object map 68—with the object. (For ease of illustration, FIG. 3 represents each location with the generic term "(LOC)," except for in object map 68.) List 72 may be referred to as a "full list," in that the list contains all the objects identified in the image.

Subsequently, the processor may use object map 68 to generate a reduced list 74, which does not include one or more of the background objects in list 72. Next, the processor may transfer reduced list 74 to the remote server and/or to storage. Since the remote server also stores the object map and/or the three-dimensional map from which the object map is derived, the server may readily compute (or "synthesize") an image representing the objects detected in the acquired image, as further described below.

Figure 3:
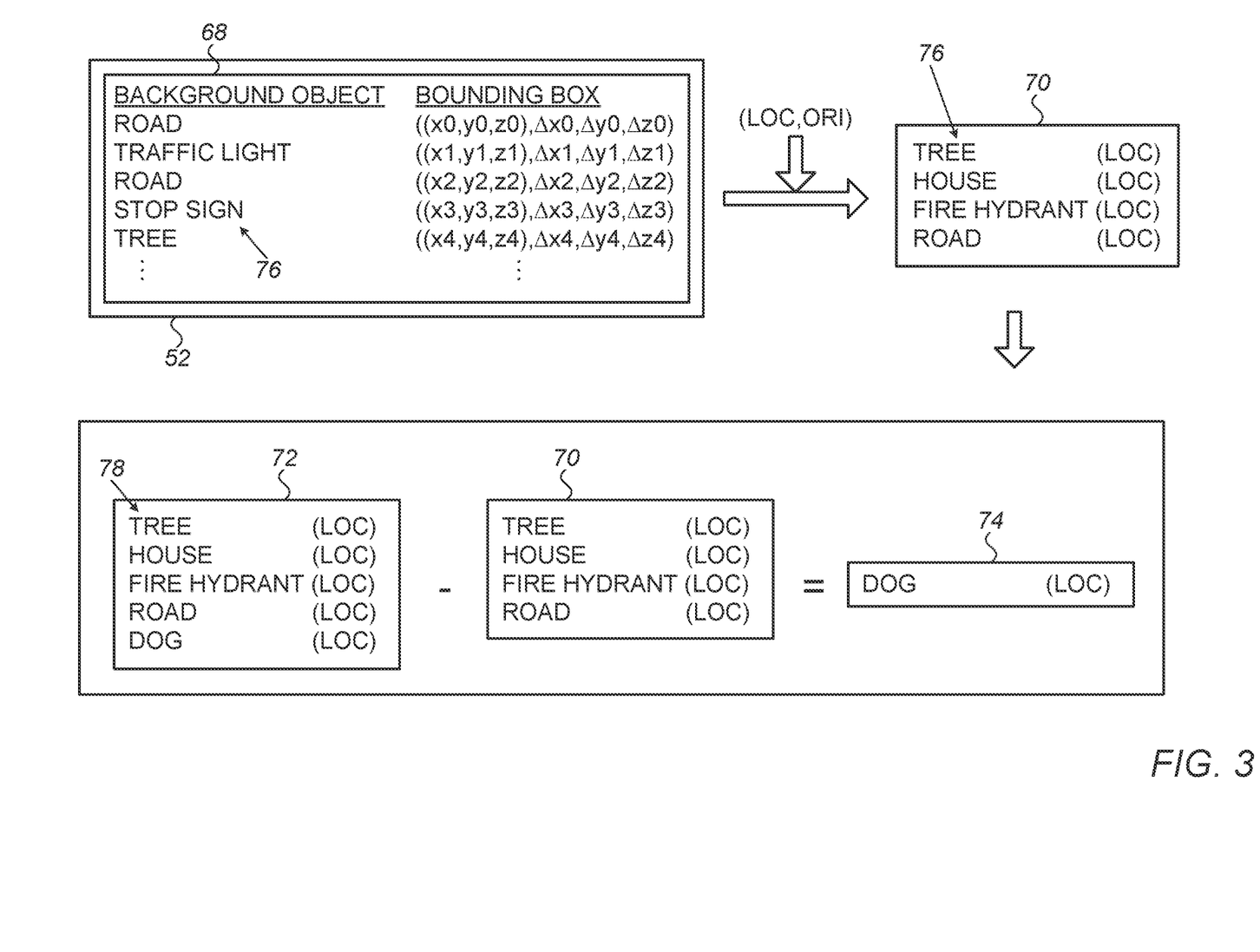
FIG. 3 is a schematic illustration of a use of an object map to reduce a volume of transferred data, in accordance with some embodiments of the present invention.

(For ease of illustration, FIG. 3 shows only a few objects 78 in list 72. However, in practice, list 72 may contain tens or hundreds of objects, such that a significant reduction in data volumes may be obtained by reducing the size of the list.)

More specifically, given object map 68 and the current location (LOC) and orientation (ORI) of the imaging sensors, processor 42 (FIG. 1) derives a reference list 70 of those of background objects 76 that are in the field of view (FOV) of the imaging sensors. Subsequently, the processor computes a reduced list 74 of the objects from list 72, by removing at least one background object 76 from list 72. For example, as shown in FIG. 3, the processor may remove all the background objects from list 72. Alternatively, the processor may refrain from removing any background objects defined, in advance, as high-importance background objects, such as a road.

For example, for each object 78, the processor may search reference list 70 for a background object of the same type whose location is within a predefined threshold of object 78. For example, given a tree whose bounding box has a top-front-left corner at (x5,y5,z5), the processor may search reference list 70 for a tree whose bounding box has a top-front-left corner at (x5±α,y5±β,z5±γ), where α, β, and γ are predefined thresholds. In response to finding such a background object, the processor may assume that object 78 and the background object are the same, and may therefore remove the object from list 72.

In response to receiving the reduced list of objects from the vehicle, the server may first derive reference list 70 from object map 68, as described above, based on the location and orientation of the imaging sensors received from the vehicle. (For embodiments in which high-importance background objects are included in the reduced list, the server may refrain from placing any high-importance background objects in reference list 70.) Subsequently, the server may compute list 72 by combining the reference list with the reduced list. Next, the server may synthesize an image representing the acquired image by rendering, on display 34 (FIG. 1), each of the objects in list 72 at the appropriate location on the display. (The appropriate location may be computed from the (real-world) location specified in the list together with the current location and orientation of each of the relevant imaging sensors.) Alternatively, instead of explicitly computing list 72, the server may simply render each object in the reference list and in the reduced list.

Alternatively, the server may derive reference image 64 from map 52, as described above with reference to FIG. 2. Subsequently, the server may synthesize the image by superimposing a rendering each of the objects in reduced list 74 onto the appropriate portion of the reference image, i.e., the server may render each of the objects at the appropriate location in the reference image. In such embodiments, the server may not require object map 68.

In alternative embodiments, the vehicle transfers list 72 to the remote server and/or to storage without first reducing the size of the list. In response to receiving list 72, the server generates the representative image by rendering each of the objects in the list as described above. In such embodiments, object map 68 may not be required at all.

In yet other alternative embodiments, a hybrid technique, which incorporates elements of both FIG. 2 and FIG. 3, is performed. Per this technique, the vehicle iterates through list 70. For each background object in the list, the vehicle identifies the pixels (or voxels) in image 56 included in the bounding box of the object, and then sets these pixels (or voxels) to a fixed background value. By removing background information from image 56 in this manner, the vehicle generates difference image 62. The vehicle may then compress and transfer the difference image as described above with reference to FIG. 2.

In such embodiments, the server iterates through list 70 and renders each background object contained therein at the appropriate location in the decompressed difference image. The server thus computes an approximation to image 56 that includes a combination of image content acquired by the vehicle and synthesized image content.

Example Algorithms

Figure 4A:
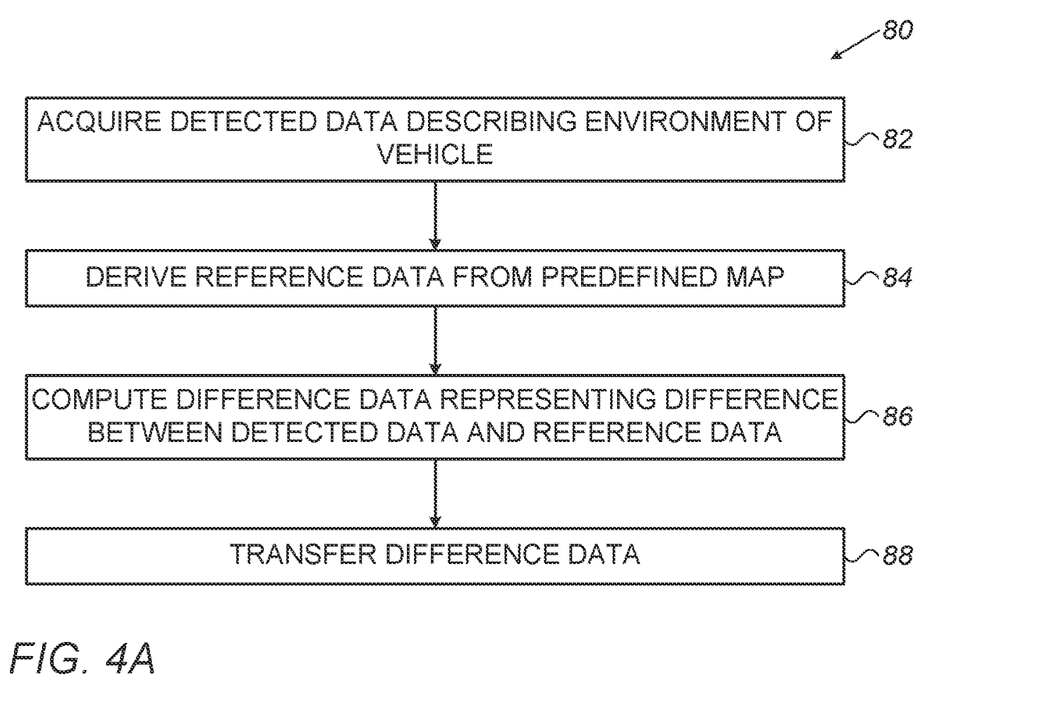
FIG. 4A is a flow diagram for an algorithm for transferring a reduced volume of detected data, in accordance with some embodiments of the present invention.

Reference is now made to FIG. 4A, which is a flow diagram for an algorithm 80 for transferring a reduced volume of detected data, in accordance with some embodiments of the present invention. Algorithm 80 is executed by processor 42 belonging to vehicle 22 (FIG. 1).

Algorithm 80 begins with a data-acquiring step 82, at which the processor, using at least one imaging sensor belonging to the vehicle, acquires detected data describing the environment of the vehicle. The detected data may include, for example, an image acquired by the sensor and/or a list of objects identified in such an image (and hence present in the FOV of the sensor), as described above with reference to FIGS. 2-3 respectively.

Subsequently to data-acquiring step 82, the processor, at a reference-data-deriving step 84, derives reference data, which described the environment, from predefined map 52 (FIG. 1). For example, the processor may derive a reference image and/or a reference list of background objects, as described above with reference to FIGS. 2-3 respectively.

Next, at a difference-data-computing step 86, the processor compares the detected data to the reference data, i.e., the processor computes difference data representing the difference between the detected data and the reference data. The difference data may include, for example, a difference image and/or a reduced list of detected objects, as described above with reference to FIGS. 2-3 respectively.

Finally, at a data-transferring step 88, the processor transfers the difference data to the remote server or to storage. As described above with reference to FIG. 2, prior to transferring a difference image, the processor may compress the difference image.

In some embodiments, reference-data-deriving step 84 is performed prior to data-acquiring step 82. Alternatively, these two steps may be executed continually, in parallel to one another. Each acquired data item (i.e., each acquired image or object list) is compared to the reference data item derived closest in time to the acquired data item. In this manner, the processor may stream the difference data at a relatively high rate.

Figure 4B:
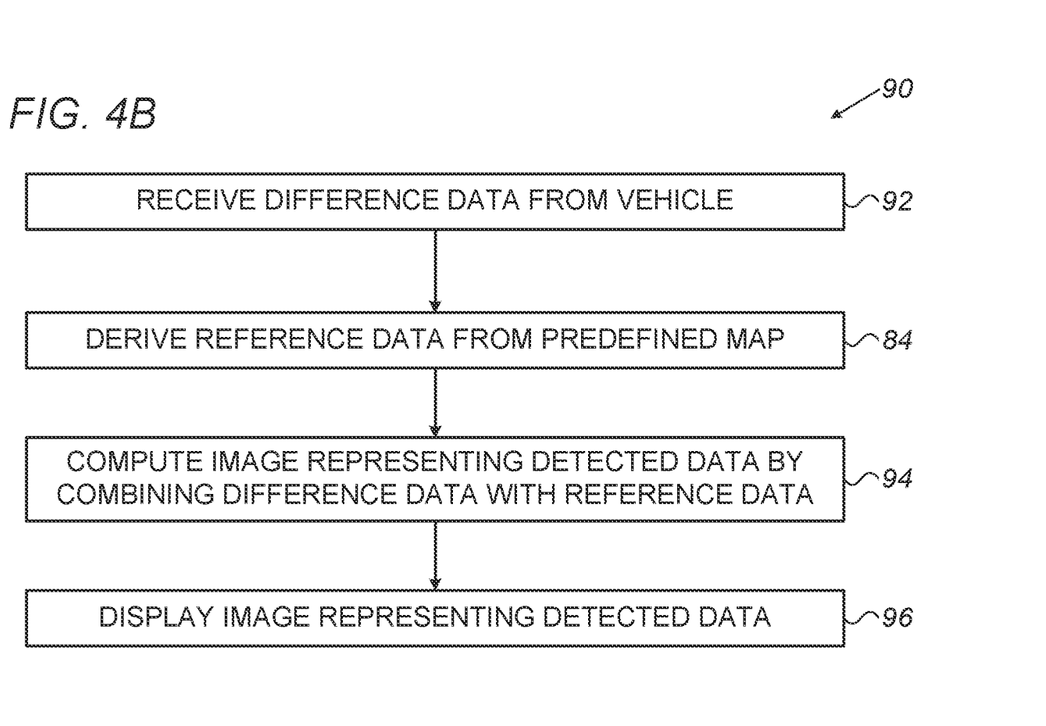
FIG. 4B is a flow diagram for an algorithm for computing an image representing detected data, in accordance with some embodiments of the present invention.

Reference is now made to FIG. 4B, which is a flow diagram for an algorithm 90 for computing an image representing detected data, in accordance with some embodiments of the present invention. Algorithm 90 is executed by processor 36 (FIG. 1) belonging to the remote server.

Algorithm 90 begins with a data-receiving step 92, at which the processor receives the difference data, from the vehicle, over network 21. Subsequently, the processor derives the relevant reference data at reference-data-deriving step 84.

Next, at an image-computing step 94, the processor computes an image representing the detected data acquired by the vehicle at data-acquiring step 82 (FIG. 4A), by combining the difference data with the reference data. For example, as described above with reference to FIG. 2, the processor may compute an image representing the image acquired by the vehicle, by adding a difference image to a reference image. Alternatively, as described above with reference to FIG. 3, the processor may compute an image representing a full list of objects, by combining a reduced list of objects with a reference list of objects or with a reference image.

Finally, at a displaying step 96, the processor displays the image representing the detected data.

In some embodiments, reference-data-deriving step 84 is performed prior to data-receiving step 92. Alternatively, these two steps may be executed continually, in parallel to one another. Each received data item is compared to the reference data item derived closest in time to the received data item.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
at least one imaging sensor; and
a processor, wherein the processor is configured to:
acquire detected data describing an environment of a vehicle using the at least one imaging sensor;
derive reference data which describes the environment from a predefined map;
compute difference data representing a difference between the detected data and the reference data; and
transfer the difference data, wherein an image computed based on the difference data and the reference data represents the detected data.

2. The system of claim 1, wherein the detected data include a detected-data image, wherein the reference data include a reference image, wherein the difference data includes a difference image, wherein the processor is further configured to:
compute the difference image by subtracting the reference image from the detected-data image.

3. The system of claim 2, wherein the processor is further configured to:
compress the difference image.

4. The system of claim 3, wherein the difference image is compressed prior to the transfer of the difference data.

5. The system of claim 3, wherein the image computed based on the difference data and the reference data is computed by decompressing the compressed difference image and adding the decompressed difference image to the reference image.

6. The system of claim 2, wherein the predefined map is a voxel map, wherein the reference image is derived from the voxel map.

7. The system of claim 2, wherein the detected-data image, the reference image, and the difference image are three-dimensional.

8. The system of claim 1, wherein the processor is configured to transfer the difference data to storage.

9. The system of claim 1, wherein the processor is configured to transfer the difference data to a remote server over at least one network.

10. A non-transitory computer readable medium having stored thereon instructions for causing a processing circuitry to execute a process, the process comprising:
acquiring detected data describing an environment of a vehicle using at least one imaging sensor;
deriving reference data which describes the environment from a predefined map;
computing difference data representing a difference between the detected data and the reference data; and
transferring the difference data, wherein an image computed based on the difference data and the reference data represents the detected data.

11. A method, comprising:
acquiring detected data describing an environment of a vehicle using at least one imaging sensor;
deriving reference data which describes the environment from a predefined map;
computing difference data representing a difference between the detected data and the reference data; and transferring the difference data, wherein an image computed based on the difference data and the reference data represents the detected data.

12. The method of claim 11, wherein the detected data include a detected-data image, wherein the reference data include a reference image, wherein the difference data includes a difference image, further comprising:
computing the difference image by subtracting the reference image from the detected-data image.

13. The method of claim 12, further comprising:
compressing the difference image.

14. The method of claim 13, wherein the difference image is compressed prior to the transfer of the difference data.

15. The method of claim 13, wherein the image computed based on the difference data and the reference data is computed by decompressing the compressed difference image and adding the decompressed difference image to the reference image.

16. The method of claim 12, wherein the predefined map is a voxel map, wherein the reference image is derived from the voxel map.

17. The method of claim 12, wherein the detected-data image, the reference image, and the difference image are three-dimensional.

18. The method of claim 11, wherein the difference data is transferred to storage.

19. The method of claim 11, wherein the difference data is transferred to a remote server over at least one network.

* * * * *